(12) United States Patent
Takeda et al.

(10) Patent No.: US 12,200,721 B2
(45) Date of Patent: Jan. 14, 2025

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 513 days.

(21) Appl. No.: 17/602,650

(22) PCT Filed: Apr. 9, 2020

(86) PCT No.: PCT/JP2020/015993
§ 371 (c)(1),
(2) Date: Oct. 8, 2021

(87) PCT Pub. No.: WO2020/209339
PCT Pub. Date: Oct. 15, 2020

(65) Prior Publication Data
US 2022/0167386 A1    May 26, 2022

(30) Foreign Application Priority Data
Apr. 11, 2019 (JP) .................... 2019-087880

(51) Int. Cl.
*H04W 72/23* (2023.01)
(52) U.S. Cl.
CPC .................. *H04W 72/23* (2023.01)

(58) Field of Classification Search
CPC ...................................................... H04W 72/23
See application file for complete search history.

(56) References Cited

U.S. PATENT DOCUMENTS

| | | | |
|---|---|---|---|
| 2019/0312635 A1* | 10/2019 | Ang | H04L 5/0007 |
| 2020/0314747 A1* | 10/2020 | Zhou | H04L 5/0053 |
| 2022/0159700 A1* | 5/2022 | Maleki | H04W 72/23 |
| 2022/0217579 A1* | 7/2022 | Seo | H04L 1/1896 |

OTHER PUBLICATIONS

OPPO; "UE Adaptation to the Traffic and UE Power Consumption"; 3GPP TSG RAN WG1 #96, R1-1902745; Athens, Greece; Feb. 25-Mar. 1, 2019 (14 pages).
Apple Inc.; "UE Power Saving Techniques"; 3GPP TSG-RAN WG1 Meeting #96, R1-1902771; Athens, Greece; Feb. 25-Mar. 1, 2019 (15 pages).

(Continued)

*Primary Examiner* — Mohammad S Adhami
(74) *Attorney, Agent, or Firm* — Osha Bergman Watanabe & Burton LLP

(57) ABSTRACT

A user terminal according to an aspect of the present disclosure includes a receiving section that receives information indicating or activating one of a plurality of sets, each of the plurality of sets containing a plurality of time offsets between a time unit receiving downlink control information and a time unit receiving a downlink shared channel scheduled by way of the downlink control information or transmitting an uplink shared channel scheduled by way of the downlink control information, and a control section that controls falling into a sleep state based on the set indicated or activated by the information.

3 Claims, 7 Drawing Sheets

(56) References Cited

OTHER PUBLICATIONS

Office Action issued in Japanese Application No. 2021-513701 dated Apr. 4, 2023 (7 pages).
Office Action issued in Japanese Application No. 2021-513701 dated Oct. 31, 2023 (12 pages).
CATT; "Evaluation results of UE Power Saving Schemes"; 3GPP TSG RAN WG1 Ad-Hoc Meeting 1901, R1-1901273; Taipei; Jan. 21-25, 2019 (14 pages).
International Search Report for corresponding International Application No. PCT/JP2020/015993, mailed Jul. 7, 2020 (3 pages).
Written Opinion for corresponding International Application No. PCT/JP2020/015993, mailed Jul. 7, 2020 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
CATT; "Power saving scheme with cross-slot scheduling operation"; 3GPP TSG RAN WG1 Meeting #96bis, R1-1905369; Xi'an, China; Apr. 8-12, 2019 (6 pages).
MediaTek Inc.; "Summary of Cross-Slot Scheduling"; 3GPP TSG RAN WG1 Meeting #96-Bis, R1-1905755; Xi'an, China; Apr. 8-12, 2019 (12 pages).

\* cited by examiner

FIG. 1A

```
PDSCH-TimeDomainResourceAllocationList ::= SEQUENCE (SIZE(1..maxNrofDL-
Allocations)) OF PDSCH-TimeDomainResourceAllocation PDSCH-TimeDomainResourceAllocation ::=    SEQUENCE {
    k0                      INTEGER(0..32)                          OPTIONAL,   -- Need S
    mappingType             ENUMERATED (typeA, typeB),
    startSymbolAndLength    INTEGER (0..127)
}
```

FIG. 1B

```
PUSCH-TimeDomainResourceAllocationList ::= SEQUENCE (SIZE(1..maxNrofUL-
Allocations)) OF PUSCH-TimeDomainResourceAllocation PUSCH-TimeDomainResourceAllocation ::=    SEQUENCE {
    k2                      INTEGER(0..32)                          OPTIONAL,   -- Need S
    mappingType             ENUMERATED (typeA, typeB),
    startSymbolAndLength    INTEGER (0..127)
}
```

FIG. 2A

| ROW INDEX | K0 | SLIV |
|---|---|---|
| 1 | 0 | SLIV#1 |
| 2 | 0 | SLIV#2 |
| 3 | 0 | SLIV#3 |
| 4 | 0 | SLIV#4 |
| 5 | 0 | SLIV#5 |
| 6 | 0 | SLIV#6 |
| 7 | 0 | SLIV#7 |
| 8 | 0 | SLIV#8 |
| 9 | 2 | SLIV#9 |
| 10 | 2 | SLIV#10 |
| 11 | 4 | SLIV#11 |
| 12 | 4 | SLIV#12 |
| 13 | 8 | SLIV#13 |
| 14 | 8 | SLIV#14 |
| 15 | 8 | SLIV#15 |
| 16 | 8 | SLIV#16 |

FIG. 2B

| ROW INDEX | K0 | SLIV |
|---|---|---|
| 1 | 2 | SLIV#1 |
| 2 | 2 | SLIV#2 |
| 3 | 2 | SLIV#3 |
| 4 | 2 | SLIV#4 |
| 5 | 2 | SLIV#5 |
| 6 | 2 | SLIV#6 |
| 7 | 2 | SLIV#7 |
| 8 | 2 | SLIV#8 |
| 9 | 4 | SLIV#9 |
| 10 | 4 | SLIV#10 |
| 11 | 4 | SLIV#11 |
| 12 | 4 | SLIV#12 |
| 13 | 8 | SLIV#13 |
| 14 | 8 | SLIV#14 |
| 15 | 8 | SLIV#15 |
| 16 | 8 | SLIV#16 |

FIG. 3A

IN CASE THAT K0 SET INFORMATION INDICATES OR ACTIVATES SECOND K0 SET
(SECOND TABLE)

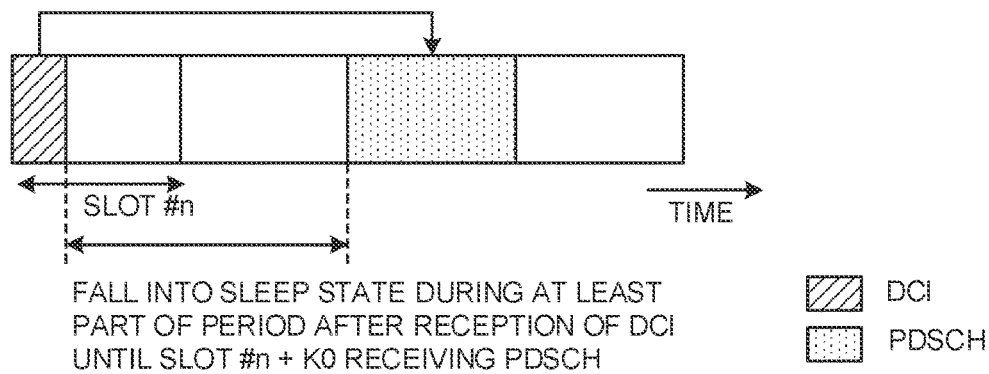

FALL INTO SLEEP STATE DURING AT LEAST
PART OF PERIOD AFTER RECEPTION OF DCI
UNTIL SLOT #n + K0 RECEIVING PDSCH

FIG. 3B

IN CASE THAT K0 SET INFORMATION INDICATES OR ACTIVATES FIRST K0 SET
(FIRST TABLE)

PREPARE FOR RECEPTION OF PDSCH (WAKE STATE)

FIG. 3C

IN CASE THAT K0 SET INFORMATION INDICATES OR ACTIVATES SECOND K0 SET
(FIRST TABLE)

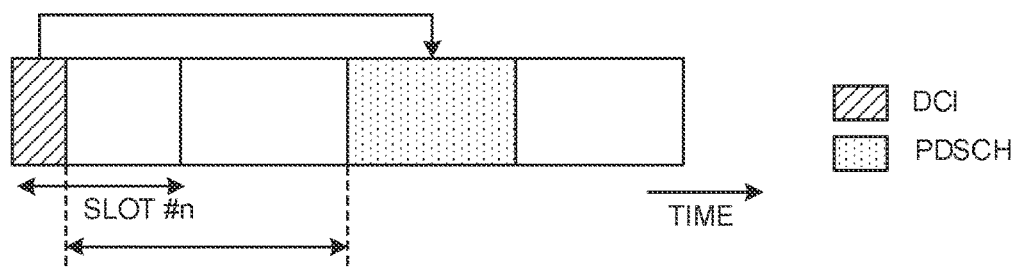

PREPARE FOR RECEPTION OF PDSCH DURING
PERIOD AFTER RECEPTION OF DCI UNTIL SLOT
n + K0 RECEIVING PDSCH (WAKE STATE)

USER TERMINAL AND RADIO COMMUNICATION METHOD

TECHNICAL FIELD

The present disclosure relates to a user terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

In existing LTE systems (for example, 3GPP Rel. 8 to Rel. 14), a user terminal (User Equipment (UE)) controls a transmission of an uplink shared channel (for example, Physical Uplink Shared Channel (PUSCH)) and reception of a downlink shared channel (for example, Physical Downlink Control Channel (PDSCH)) in accordance with a downlink control information (DCI).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (hereinafter, referred to as "NR"), a study is underway to determine a time domain resource (for example, symbols) allocated to a downlink shared channel (for example, Physical Downlink Control Channel (PDSCH)) or the uplink shared channel (for example, Physical Uplink Shared Channel (PUSCH)) in a slot, based on a value of a certain field in a downlink control information (DCI).

Here, in NR, a study is underway to perform reception of the DCI and reception of the PDSCH scheduled by way of the DCI or transmission of the PUSCH scheduled by way of the DCI in the same slot or different slots. Performing of reception of the DCI and reception of the PDSCH or transmission of the PUSCH in the different slots is also referred to as cross-slot scheduling or the like.

In the cross-slot scheduling, the UE is expected to fall into a sleep state (also referred to as a micro-sleep, or the like) during at least part of a period from the reception of the DCI to the reception of the PDSCH scheduled by way of the DCI, or during at least part of a period from the reception of the DCI to the transmission of the PUSCH scheduled by way of the DCI to reduce power consumption of the UE (power-saving).

In view of this, an object of the present disclosure is to provide a user terminal and a radio communication method that can realize the power-saving.

Solution to Problem

A user terminal according to an aspect of the present disclosure includes a receiving section that receives information indicating or activating one of a plurality of sets, each of the plurality of sets containing a plurality of time offsets between a time unit receiving downlink control information and a time unit receiving a downlink shared channel scheduled by way of the downlink control information or transmitting an uplink shared channel scheduled by way of the downlink control information, and a control section that controls falling into a sleep state based on the set indicated or activated by the information.

Advantageous Effects of Invention

According to an aspect of the present disclosure, power-saving can be realized.

BRIEF DESCRIPTION OF DRAWINGS

FIGS. 1A and 1B are diagrams to show examples of a PDSCH time domain allocation list and a PUSCH time domain allocation list, respectively;

FIGS. 2A and 2B are diagrams to show examples of first and second tables corresponding to first and second K0 sets according to a first aspect, respectively;

FIGS. 3A to 3C are diagrams to show examples of control on falling into a sleep state;

DESCRIPTION OF EMBODIMENTS

Figure 4:
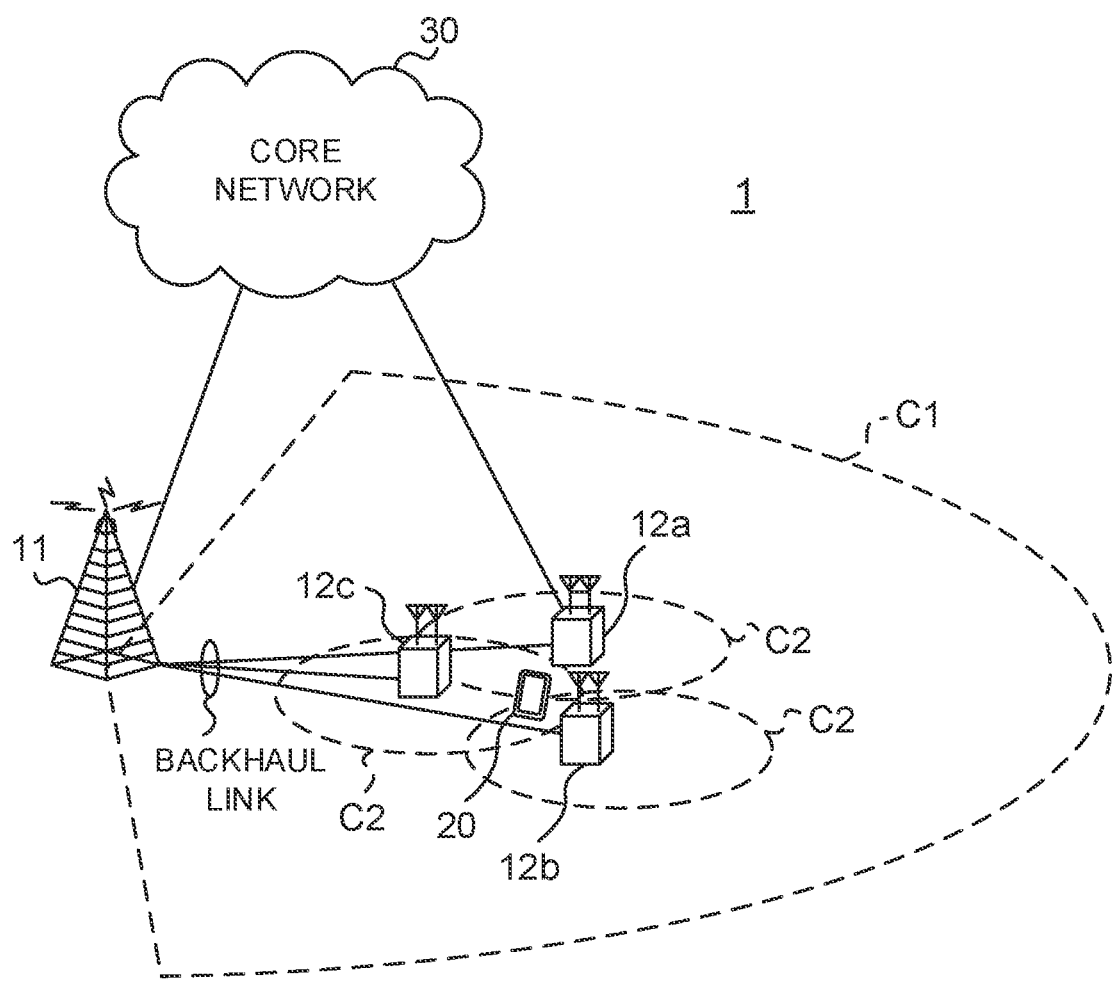
FIG. 4 is a diagram to show an example of a schematic structure of a radio communication system according to one embodiment.

In NR, a study is underway that a user terminal (UE (User Equipment) determines a time domain resource (for example, one or more symbols) allocated to a downlink shared channel (also referred to as a Physical Downlink Shared Channel (PDSCH), or the like) or an uplink shared channel (also referred to as a Physical Uplink Shared Channel (PUSCH), or the like), based on a value of a certain field (e.g., a time domain resource allocation (Time Domain Resource Assignment or allocation (TDRA)) field) in downlink control information (DCI).

<PDSCH Time Domain Resource Allocation>

A size (the number of bits) of the TDRA field in the DCI (DL assignment, for example, DCI format 1_0 or 1_1) used to schedule the PDSCH may be fixed or variable.

For example, the size of the TDRA field in DCI format 1_0 may be fixed to the certain number of bits (for example, four bits). On the other hand, the size of the TDRA field in DCI format 1_1 may be the number of bits changed by a certain parameter (for example, zero to four bits).

The above certain parameter used to determine the size of the TDRA field may be the number of entries in an allocation list of time domain for PDSCH (or downlink data) (PDSCH time domain allocation list), for example.

For example, the PDSCH time domain allocation list may be an RRC control element "pdsch-TimeDomainAllocationList" or "PDSCH-TimeDomainResourceAllocationList", for example. The PDSCH time domain allocation list may be used to configure a time domain relation between a PDCCH and a PDSCH. The respective entries in the PDSCH time domain allocation list may be referred to as allocation information of time domain resource for PDSCH (PDSCH time domain allocation information) or the like, and may be the RRC control element "PDSCH-TimeDomainResourceAllocation", for example.

The PDSCH time domain allocation list may be included in a cell-specific PDSCH parameter (for example, an RRC control element "pdsch-ConfigCommon"), or may be included in a UE-specific (applied to a particular BWP and UE-specific) parameter (for example, an RRC control element "pdsch-Config"). As described above, the PDSCH time domain allocation list may be cell-specific or UE-specific.

FIG. 1A is a diagram to show an example of the PDSCH time domain allocation list. As shown in FIG. 1A, each piece of PDSCH time domain allocation information in the PDSCH time domain allocation list may include at least one of information indicating a time offset K0 (also referred to as k0, $K_0$, and the like) between the DCI and the PDSCH scheduled by way of the DCI (also referred to as offset information, K0 information, or the like), information indicating a mapping type of the PDSCH (mapping type information), and an index giving a combination of a start symbol S and a time length L of the PDSCH (Start and Length Indicator (SLIV)).

Alternatively, the above certain parameter used to determine the size of the TDRA field may be the number of entries in a default table for the time domain allocation for the PDSCH or downlink data (for example, default PDSCH time domain allocation A). The default table may be pre-defined by a specification. Each row in the default table may be associated with at least one of a row index, information indicating a position of a DMRS, the mapping type information describe above, the K0 information described above, information indicating the start symbol S of the PDSCH, and information indicating the number of symbols L allocated to the PDSCH.

The UE may determine the row index of a certain table (an entry number or an entry index), based on a value of the TDRA field in the DCI (for example, DCI format 1_0 or 1_1). The certain table may be a table based on the PDSCH time domain allocation list, or the default table described above.

The UE may determine the time domain resource allocated to the PDSCH (for example, the certain number of symbols) in a certain slot (one or more slots), based on at least one of the K0 information, the SLIV, the start symbol S, and the time length L which are specified by a row (or an entry) corresponding to the row index.

Note that the K0 information described above may indicate the time offset K0 between the DCI and the PDSCH scheduled by way of the DCI with the number of slots. The UE may determine a slot receiving the PDSCH by the time offset K0. For example, the UE, in a case of receiving the DCI scheduling the PDSCH in slot #n, may determine a slot receiving the PDSCH (or a slot allocated to the PDSCH), based on at least one of the number n of the slot, a PDSCH subcarrier spacing $\mu_{PCSCH}$, a PDCCH subcarrier spacing $\mu_{PCCCH}$, and the time offset K0 described above.

<PUSCH Time Domain Resource Allocation>

A size (the number of bits) of the TDRA field in the DCI (UL grant, for example, DCI format 0_0 or 0_1) used to schedule the PUSCH may be fixed or variable.

For example, the size of the TDRA field in DCI format 0_0 may be fixed to the certain number of bits (for example, four bits). On the other hand, the size of the TDRA field in DCI format 0_1 may be the number of bits changed by a certain parameter (for example, zero to four bits).

The above certain parameter used to determine the size of the TDRA field may be the number of entries in an allocation list of time domain for PUSCH (or uplink data) (PUSCH time domain allocation list), for example.

For example, the PUSCH time domain allocation list may be an RRC control element "pusch-TimeDomainAllocationList" or "PUSCH-TimeDomainResourceAllocationList", for example. The respective entries in the PUSCH time domain allocation list may be referred to as allocation information of time domain resource for PUSCH (PUSCH time domain allocation information) or the like, and may be the RRC control element "PUSCH-TimeDomainResourceAllocation", for example.

The PUSCH time domain allocation list may be included in a cell-specific PUSCH parameter (for example, an RRC control element "pusch-ConfigCommon"), or may be included in a UE-specific (applied to a particular bandwidth part (BWP) and UE-specific) parameter (for example, an RRC control element "pusch-Config"). As described above, the PUSCH time domain allocation list may be cell-specific or UE-specific.

FIG. 1B is a diagram to show an example of the PUSCH time domain allocation list. As shown in FIG. 1B, each piece of PUSCH time domain allocation information in the PUSCH time domain allocation list may include at least one of information indicating a time offset K2 (also referred to as k2, $K_2$, and the like) between the DCI and the PUSCH scheduled by way of the DCI (offset information, K2 information), information indicating a mapping type of the PUSCH (mapping type information), and an index giving a combination of a start symbol and a time length of the PUSCH (Start and Length Indicator (SLIV)).

Alternatively, the above certain parameter used to determine the size of the TDRA field may be the number of entries in a default table for the time domain allocation for the PUSCH or uplink data (for example, default PUSCH time domain allocation A). The default table may be pre-defined by a specification. Each row in the default table may be associated with at least one of a row index, the mapping type information describe above, the K2 information described above, information indicating the start symbol S of the PUSCH, and information indicating the number of symbols L allocated to the PUSCH.

The UE may determine the row index of a certain table (an entry number or an entry index), based on a value of the TDRA field in the DCI (for example, DCI format 0_0 or 0_1). The certain table may be a table based on the PUSCH time domain allocation list, or the default table described above.

The UE may determine the time domain resource allocated to the PUSCH (for example, the certain number of symbols) in a certain slot (one or more slots), based on at least one of the K2 information, the SLIV, the start symbol S, and the time length L which are specified by a row (or an entry) corresponding to the row index.

Note that the K2 information described above may indicate the time offset K2 between the DCI and the PUSCH scheduled by way of the DCI with the number of slots. The UE may determine a slot transmitting the PUSCH by the time offset K2. For example, the UE, in a case of receiving the DCI scheduling the PUSCH in slot #n, may determine a slot transmitting the PUSCH (or a slot allocated to the PUSCH) based on at least one of the number n of the slot, a PUSCH subcarrier spacing $\mu_{PUSCH}$, a PDCCH subcarrier spacing $\mu_{PDCCH}$, and the time offset K2 described above.

Here, in NR, a study is underway to perform reception of the DCI and reception of the PDSCH scheduled by way of the DCI or transmission of the PUSCH scheduled by way of the DCI in the same slot or different slots. Performing of reception of the DCI and reception of the PDSCH or transmission of the PUSCH in the different slots is also referred to as cross-slot scheduling or the like.

In the cross-slot scheduling, the UE is expected to fall into a sleep state during at least part of a period from reception of the DCI to reception of the PDSCH scheduled by way of the DCI, or during at least part of a period from reception of the DCI to transmission of the PUSCH scheduled by way of the DCI to contribute to reduction of power consumption of the UE (power-saving). Note that the sleep state may be referred to as an off state, a micro-sleep, or the like.

However, in the time domain resource allocation using the TDRA field (for example, four bits) in the DCI described above, only a single table with 16 entries (rows) can be used. In a case that the time offset (K0 or K2) indicated by at least one row in the certain table described above is zero (0), the UE needs to prepare for reception of a PDSCH or transmission of a PUSCH in a slot the same as the DCI. As a result, the power-saving may be unlikely to be realized.

In view of this, the inventors of the present invention came up with the idea that a plurality of sets at least including a set containing only the time offset (K0 or K2) larger than zero (0) and a set possibly containing the time offset equal to zero (0) are configured for the UE or predefined by a specification so that falling into the sleep state is appropriately controlled by indicating or activating one of the plurality of sets. This can appropriately control the power-saving.

Hereinafter, embodiments according to the present disclosure will be described in detail with reference to the drawings.

In the present disclosure, each of the sets including a plurality of time offsets and a table corresponding to each set may be interchangeably interpreted. Each time offset in each set, an entry in a table corresponding to each set, each row, and each time offset may be interchangeably interpreted.

Note that hereinafter, each set or each table contains a plurality of time offsets or a row containing a plurality of time offsets, without limitation, so long as it includes one or more time offsets or one or more rows. In the present disclosure, a certain field in the DCI used to determine the PDSCH or PUSCH time domain resource is the TDRA field, a name of which is not limited thereto.

First Aspect

In a first aspect, the UE receives information indicating or activating one of the plurality of sets each of which contains the plurality of time offsets K0 (hereinafter, also referred to as K0 sets) (hereinafter, referred to as K0 set information).

As described above, the time offset K0 may be a time offset between a time unit receiving the DCI and a time unit receiving the PDSCH scheduled by way of the DCI. The time unit is a slot, for example, but may be a time unit shorter than a slot (for example, a sub-slot), a symbol, or the like.

The plurality of K0 sets may be configured for the UE through higher layer signaling (for example, RRC signaling), or predefined by a specification.

For example, each time offset K0 in each K0 set may be K0 information in each piece of PDSCH time domain allocation information (for example, the RRC control element "PDSCH-TimeDomainResourceAllocation") in the PDSCH time domain allocation information list described above (for example, the RRC control element "pdsch-TimeDomainAllocationList" or "PDSCH-TimeDomainResourceAllocationList") (for example, see FIG. 1A).

The plurality of K0 sets may contain a first set (a first K0 set) in which at least one of the plurality of time offsets K0 is zero (0) and a second set (a second K0 set) in which all of the plurality of time offsets K0 are larger than zero.

The UE may generate a plurality of tables respectively corresponding to the plurality of K0 sets as described above. A plurality of entries (rows) in each of the tables may correspond to the plurality of time offsets K0 in each of the K0 sets.

FIGS. 2A and 2B are diagrams to show examples of first and second tables corresponding to the first and second K0 sets according to the first aspect, respectively. The time offsets K0 in the rows in the first table correspond respectively to the time offsets K0 in the first K0 set, and the time offsets K0 in the rows in the second table correspond respectively to the time offsets K0 in the second K0 set.

As shown in FIG. 2A, a time offset K0 associated with an index of each row (row index) in the first table may be zero, or larger than zero. In this manner, at least one of the plurality of time offsets K0 in the first table is zero.

On the other hand, as shown in FIG. 2B, a time offset K0 associated with an index of each row (row index) in the second table may be larger than zero. In this manner, all of the plurality of time offsets K0 in the first table are larger than zero.

Note that FIGS. 2A and 2B are exemplary, and the present disclosure is not limited to these. The plurality of time offsets K0 in the first table may have any values, so long as at least one of them is zero. The plurality of time offsets K0 in the second table may have any values, so long as they are larger than zero.

In the first and second tables, the row index is associated with the time offset K0 and the SLIV, but the present disclosure is not limited to these. So long as the row index is associated with at least the time offset K0, the row index may be associated with other parameters (for example, the start symbol S and the time length L) instead of the SLIV, or additional parameters (for example, the mapping type and the like).

The number of rows in each of the first and second tables is 16, the present disclosure is not limited to this, and may be determined based on the number of bits of the TDRA field in the DCI.

The UE may receive the K0 set information described above that indicates or activates one of the plurality of K0 sets (or a table corresponding to each of the plurality of pieces of K0). Specifically, the UE may receive the K0 set information described above by using L1 signaling or a Medium Access Control (MAC) control element (CE).

For example, in the case of using L1 signaling, the K0 set information may indicate one of the plurality of K0 sets described above. In the case of using the MAC CE, the K0 set information may activate one of the plurality of K0 sets described above.

The UE may control the falling into the sleep state, based on the K0 set indicated or activated by the K0 set information (or a table corresponding to the K0 set). FIGS. 3A to 3C are diagrams to show examples of control on the falling into the sleep state according to the first aspect.

As shown in FIG. 3A, in a case that the second K0 set described above (or the second table corresponding to the second K0 set, e.g., see FIG. 2B) is indicated or activated by the K0 set information, the UE may fall into the sleep state during at least part of a period from reception of the DCI to reception of the PDSCH scheduled by way of the DCI.

For example, in FIG. 3A, the UE detects DCI for scheduling a PDSCH in slot #n by monitoring a certain search space set. The UE may determine, based on a TDRA field value m in the DCI, a row index (for example, m+1) in the second table (for example, FIG. 2B). The UE may control the falling into the sleep state, based on a time offset K0 associated with the row index.

Specifically, the UE may fall into the sleep state (or keep the sleep state) during at least part of a certain period after the reception of the DCI to slot #n until slot #n+K0 determined based on the time offset K0. For example, the UE may keep the sleep state from after the reception of the DCI in slot #n until an end of slot #n+K0−1, or may keep sleep state only during a period to slot #n after the reception of the DCI.

The UE may fall into a wake state (on state) in slot #n+K0 determined based on the time offset K0 to receive the PDSCH scheduled by way of the DCI described above. Note that the wake state is a state of preparing for reception of a PDSCH (or a state capable of receiving a PDSCH). For example, the UE may fall into the wake state at the beginning of slot #n+K0, or may fall into the wake state in slot #n+K0−1.

On the other hand, as shown in FIGS. 3B and 3C, in a case that the first K0 set described above (or the first table corresponding to the first K0 set, e.g., see FIG. 2A) is indicated or activated by the K0 set information, the UE may not fall into the sleep state.

For example, in FIGS. 3B and 3C, in a case that the UE detects DCI for scheduling a PDSCH in slot #n by monitoring a certain search space set, the UE may determine, based on a TDRA field value m in the DCI, a row index (for example, m+1) in the first table (for example, see FIG. 2A). The UE may not fall into the sleep state (or may prepare for the reception of the PDSCH) regardless of a value of a time offset K0 associated with the row index.

For example, FIG. 3B shows an example of a case of the time offset K0=0 that is determined using the first table based on the TDRA field value in the DCI. In the case of K0=0, the UE receives the PDSCH in the slot #n receiving the DCI, and thus, keeps the wake state after the reception of the DCI also.

On the other hand, FIG. 3C shows an example of the time offset K0 larger than zero (here, K0=2) that is determined using the first table based on the TDRA field value in the DCI. In the case that the first table is indicated or activated, as shown in FIG. 3C, the UE keeps the wake state (prepares for the reception of the PDSCH) during a period after the reception of the DCI to start of the reception of the PDSCH even in a case of cross-slot scheduling.

In this manner, in the case that the first table (or the first K0 set corresponding to the first table) is indicated or activated by the K0 set information, the UE may assume that the value of the TDRA field in the DCI indicates the time offset K0=0 (or the row index associated with the time offset K0=0) to prepare for the reception of the PDSCH.

Note that the UE may determine, based on the DCI format, which K0 set (or which table) in the plurality of K0 sets (or a plurality of tables respectively corresponding to the plurality of K0 sets) the time offset K0 is determined based on.

For example, even in a case that the second table (or the second K0 set corresponding to the second table) is indicated or activated by the K0 set information, when a PDSCH is scheduled by way of fallback DCI (DCI format 1_0), the UE may determine, based on a TDRA field value m in the fallback DCI, a row index (for example, m+1) in the first table. In other words, in the case that the PDSCH is scheduled by way of the fallback DCI, the UE may not fall into the sleep state.

As described above, in the first aspect, one of the plurality of K0 sets including the K0 set containing only the time offset K0 larger than zero and the K0 set containing at least one time offset of zero is indicated or activated for the UE, and the falling into the sleep state is controlled based on the indicated or activated K0 set. This can appropriately control the power-saving.

Other Aspects

In the above first aspect, the description is given of the control on the fall into the sleep state during the certain period from the reception of the DCI to the reception of the PDSCH by the DCI, but the first aspect can be adequately applied also to the falling into the sleep state during a certain period from the reception of the DCI to the transmission of the PUSCH.

In the case that the first aspect is applied to the PUSCH, the time offset K0 and K0 set described above are interpreted as the time offset K2 and the K2 set, respectively. The reception of the PDSCH is interpreted as the transmission of the PUSCH. DCI format 1_0 or 1_1 is interpreted as DCI format 0_0 or 0_1.

The PDSCH time domain allocation list described above (for example, the RRC control element "pdsch-TimeDomainAllocationList" or "PDSCH-TimeDomainResourceAllocationList") is interpreted as the PUSCH time domain allocation list described above (for example, the RRC control element "pusch-TimeDomainAllocationList" or "PUSCH-TimeDomainResourceAllocationList"). The K0 information in the PDSCH time domain allocation information (for example, the RRC control element "PDSCH-TimeDomainResourceAllocation") is interpreted as the K2 information in the PUSCH time domain allocation information (for example, the RRC control element "PUSCH-TimeDomainResourceAllocation").

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

FIG. 4 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12*a* to 12*c*) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 5:
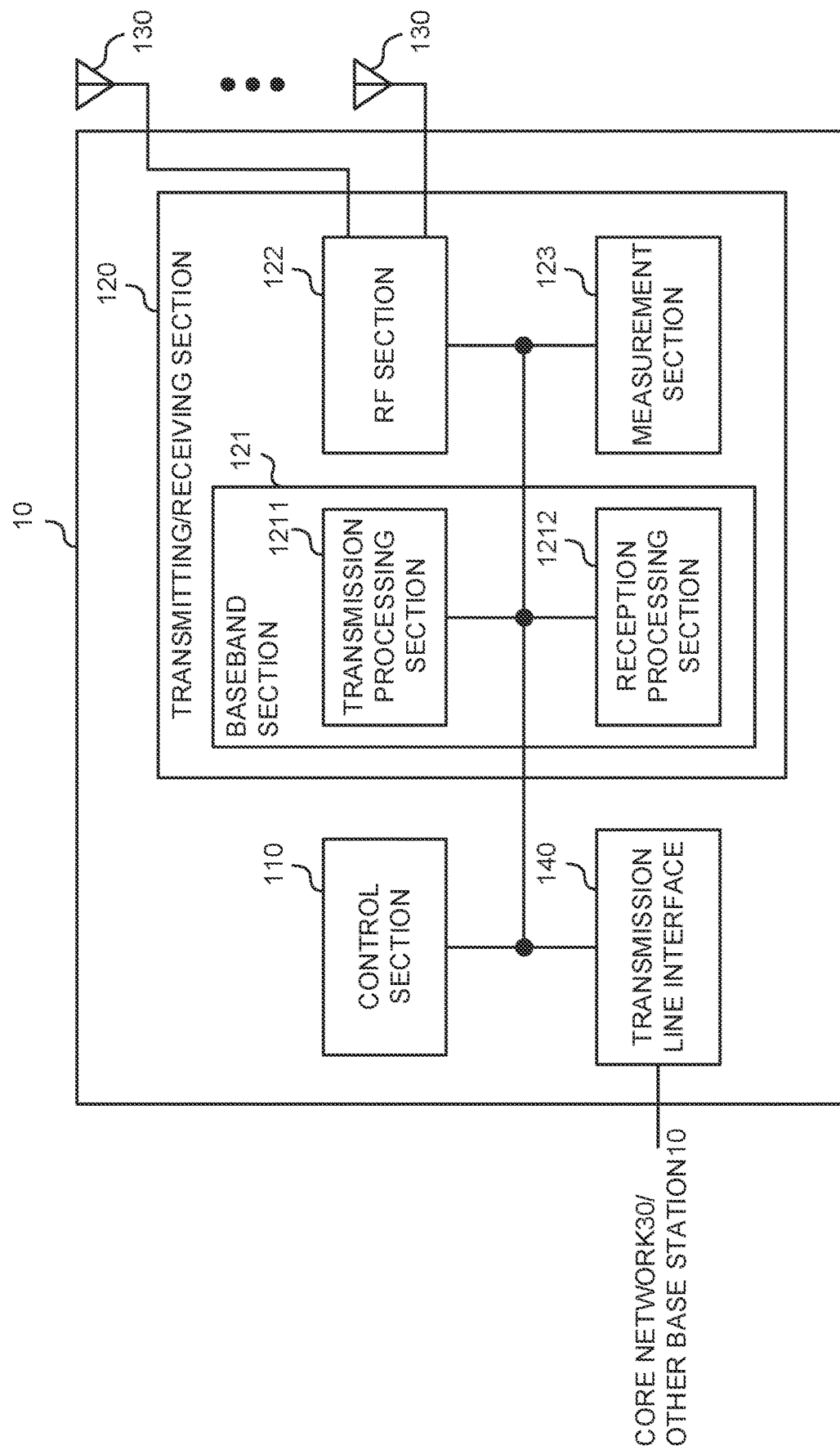
FIG. 5 is a diagram to show an example of a structure of a base station according to one embodiment.

FIG. 5 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit downlink control information. The transmitting/receiving section 120 may transmit a downlink shared channel scheduled by way of the downlink control information. The transmitting/receiving section 120 may receive an uplink shared channel scheduled by way of the downlink control information.

The transmitting/receiving section 120 may transmit information indicating or activating one of a plurality of sets each of which contains a plurality of time offsets between a time unit receiving the downlink control information (for example, a slot) and a time unit receiving the downlink shared channel scheduled by way of the downlink control information or transmitting the uplink shared channel scheduled by way of the downlink control information. The transmitting/receiving section 120 may receive the information described above by using L1 signaling or a Medium Access Control (MAC) control element.

(User Terminal)

Figure 6:
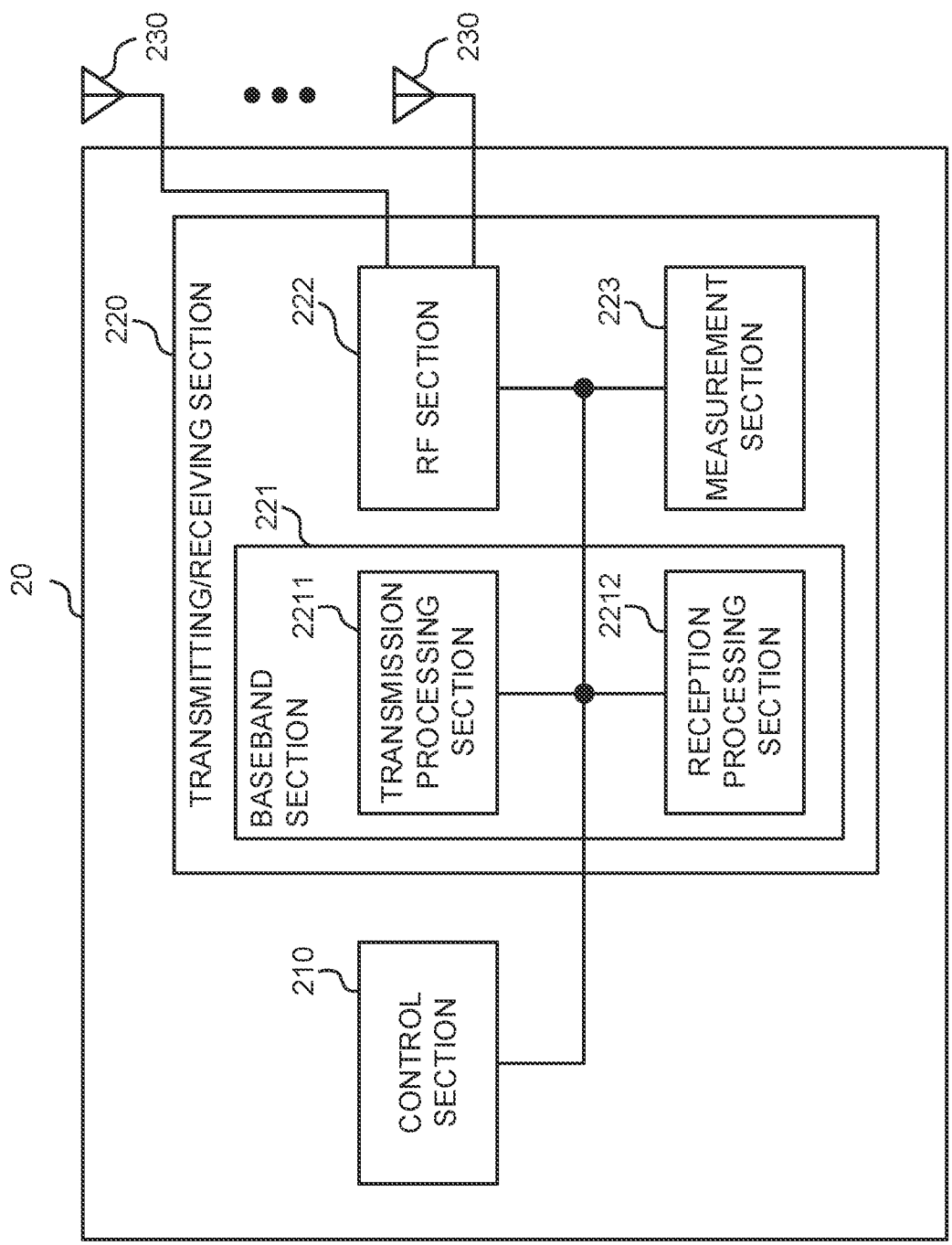
FIG. 6 is a diagram to show an example of a structure of a user terminal according to one embodiment.

FIG. 6 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the communication path interface 240.

Note that the transmitting/receiving section 220 may receive the downlink control information. The transmitting/receiving section 220 may receive a downlink shared channel scheduled by way of the downlink control information. The transmitting/receiving section 220 may transmit an uplink shared channel scheduled by way of the downlink control information.

The transmitting/receiving section 220 may receive information indicating or activating one of a plurality of sets each of which contains a plurality of time offsets between a time unit receiving the downlink control information (for example, a slot) and a time unit receiving the downlink shared channel scheduled by way of the downlink control information or transmitting the uplink shared channel scheduled by way of the downlink control information. The transmitting/receiving section 220 may receive the information described above by using L1 signaling or a Medium Access Control (MAC) control element.

The control section 210 may control falling into a sleep state, based on the set indicated or activated by the information.

The plurality of sets may contain a first set in which at least one of the plurality of time offsets is zero and a second set in which all of the plurality of time offsets are larger than zero.

In a case that the second set is indicated or activated by the information, the control section 210 may fall into the sleep state based on the time offset determined, based on a certain field value in the downlink control information in the second set.

The control section 210 may fall into the sleep state during at least part of a period from reception of the downlink control information until a slot determined based on the time offset.

In a case that the first set is indicated or activated by the information, the control section 210 may not fall into the sleep state regardless of the time offset determined based on a certain field value in the downlink control information in the first set.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining software into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 7:
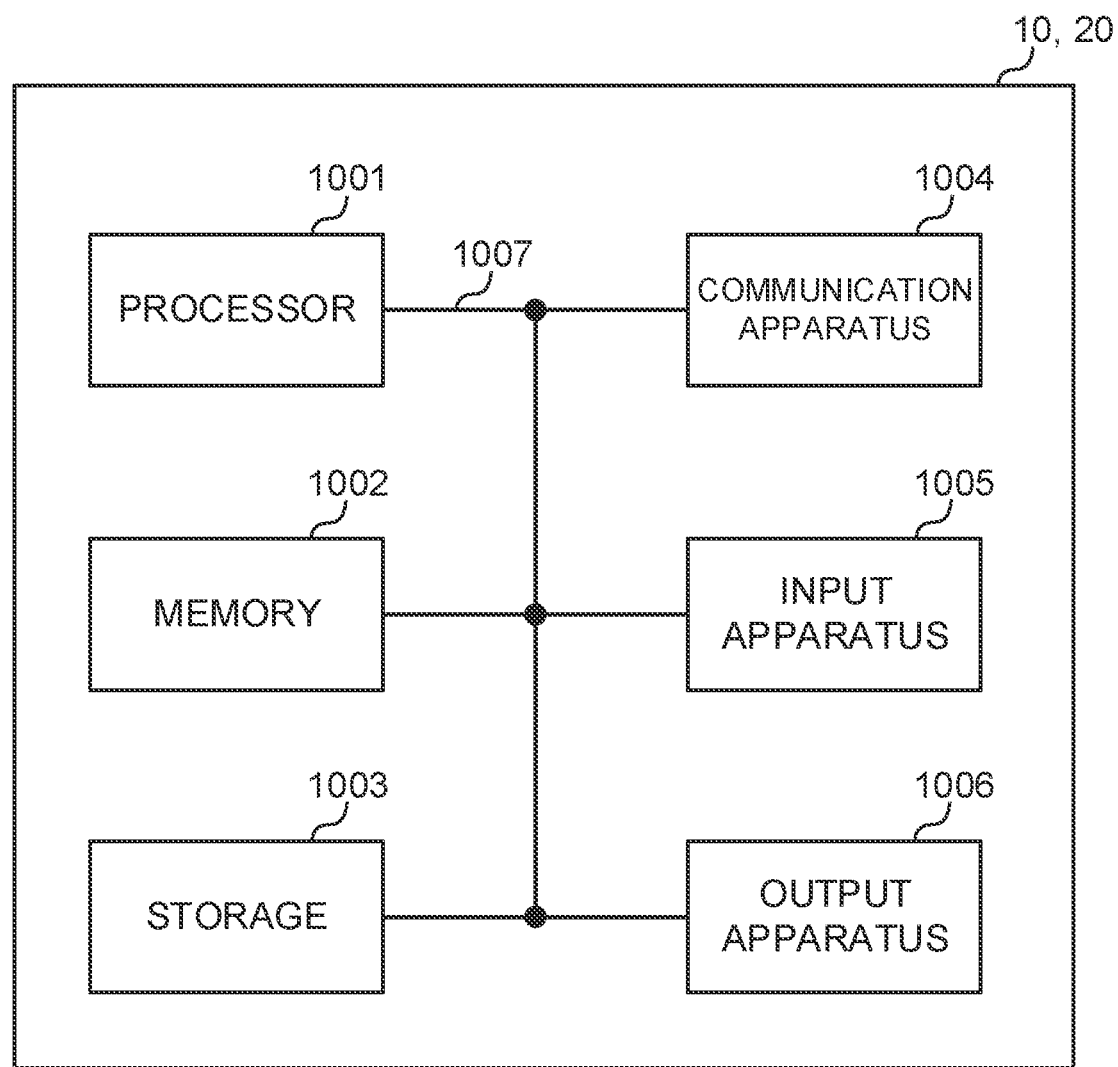
FIG. 7 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 7 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section and the receiving section can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The present application is based on Japanese Patent Application No. 2019-087880 filed on Apr. 11, 2019. The entire contents of the application are incorporated herein by reference.

What is claimed is:

1. A terminal comprising:
   a receiver that receives information regarding a first set corresponding to a first time offset wherein a time offset between downlink control information and a physical shared channel scheduled by the downlink control information is larger than zero, and information regarding a second set corresponding to a second time offset wherein the time offset is zero; and
   a processor that controls, based on a time domain resource allocation field of the downlink control information and one of the first set and second set indicated by the downlink control information, a reception of the physical shared channel,
   wherein the processor controls to perform a power saving in a reception of the physical shared channel which is cross-slot scheduled by the downlink control information when the first set is indicated by the downlink control information, and not to perform the power saving in the reception of the physical shared channel which is scheduled by a fallback DCI (DCI format 1_0).

2. A radio communication method for a terminal, comprising:
   receiving information regarding a first set corresponding to a first time offset wherein a time offset between downlink control information and a physical shared channel scheduled by the downlink control information is larger than zero, and information regarding a second set corresponding to a second time offset wherein the time offset is zero;
   controlling, based on a time domain resource allocation field of the downlink control information and one of the first set and second set indicated by the downlink control information, a reception of the physical shared channel; and controlling to perform a power saving in a reception of the physical shared channel which is cross-slot scheduled by the downlink control information when the first set is indicated by the downlink control information, and not to perform the power saving in the reception of the physical shared channel which is scheduled by a fallback DCI (DCI format 1_0).

3. A system comprising a terminal and a base station, wherein the terminal comprises:
- a receiver that receives information regarding a first set corresponding to a first time offset wherein a time offset between downlink control information and a physical shared channel scheduled by the downlink control information is larger than zero, and information regarding a second set corresponding to a second time offset wherein the time offset is zero; and
- a processor of the terminal that controls, based on a time domain resource allocation field of the downlink control information and one of the first set and second set indicated by the downlink control information, a reception of the physical shared channel,
wherein the processor controls to perform a power saving in a reception of the physical shared channel which is cross-slot scheduled by the downlink control information when the first set is indicated by the downlink control information, and not to perform the power saving in the reception of the physical shared channel which is scheduled by a fallback DCI (DCI format 1_0), and the base station comprises:
- a transmitter that transmits the information regarding the first set and the information regarding the second set; and
- a processor of the base station that controls, based on the time domain resource allocation field of the downlink control information and one of the first set and second set indicated by the downlink control information, a transmission of the physical shared channel.

* * * * *